United States Patent [19]

Sipek et al.

[11] 4,238,034
[45] Dec. 9, 1980

[54] AUTOMATIC TOOL CHANGER FOR MACHINE TOOL

[75] Inventors: Charles B. Sipek, Hales Corners; Richard Johnstone, Brookfield; Russell B. Clegg, Milwaukee, all of Wis.

[73] Assignee: Kearney & Trecker Corporation, West Allis, Wis.

[21] Appl. No.: 30,162

[22] Filed: Apr. 16, 1979

Related U.S. Application Data

[62] Division of Ser. No. 860,705, Dec. 15, 1977, Pat. No. 4,164,810.

[51] Int. Cl.³ .............................................. B23Q 3/157
[52] U.S. Cl. ...................................... 211/1.5; 29/568
[58] Field of Search ................. 211/1.5, 607; 29/568; 414/728, 730

[56] References Cited

U.S. PATENT DOCUMENTS

| | | | |
|---|---|---|---|
| 3,052,011 | 9/1962 | Brainard et al. | 211/1.5 UX |
| 3,445,923 | 5/1969 | Balding | 29/568 |
| 3,619,898 | 11/1971 | Perry et al. | 29/568 |
| 3,704,510 | 12/1972 | Sedgwick et al. | 414/730 X |
| 4,126,233 | 11/1978 | Jeske | 414/728 |

Primary Examiner—Roy D. Frazier
Assistant Examiner—Robert W. Gibson, Jr.
Attorney, Agent, or Firm—Cyril M. Hajewski

[57] ABSTRACT

A tool storage drum which is adapted to receive and store a plurality of toolholders is rotatably mounted on top of the upright of a horizontal machining center behind the spindle thereof. A tool changer carriage carrying a tool change arm is pivotally mounted on the upright above the spindle and is pivotable between a parked position in which an end of the tool changer arm is adjacent to the tool storage drum and an exchange position in which an end of the tool changer arm is adjacent to the spindle. The tool changer arm is slidably mounted on the carriage for movement between an extended and a retracted position to remove toolholders from their sockets or insert them therein and is rotatable through 180° to interchange its ends for the purpose of exchanging a tool in the spindle for a tool previously removed from the tool storage drum.

5 Claims, 36 Drawing Figures

AUTOMATIC TOOL CHANGER FOR MACHINE TOOL

This is a division of application Ser. No. 860,705 filed Dec. 15, 1977 now U.S. Pat. No. 4,164,810.

BACKGROUND OF THE INVENTION

This invention relates to automatic tool changers for machine tools. Many different types of automatic tool changers have been manufactured in the past, but all have been relatively complex and expensive and have required considerable space to accommodate their tool storage magazines. The principle object of this invention is to provide an automatic tool changer which is simpler, less expensive, more reliable, and which requires less space than the automatic tool changers heretofore known in the art. Other objects and advantages of the invention will be apparent from the detailed description herein.

SUMMARY OF THE INVENTION

A tool storage magazine which is adapted to receive and to store a plurality of toolholders is mounted on a frame behind the spindle of a machine tool. A tool changer carriage is pivotally mounted on the frame for movement between a parked and an exchange position. A double-ended tool changer arm is slidably mounted on the carriage for movement between an extended and a retracted position and is pivotally mounted on the carriage for rotation through at least 180° to interchange the ends of the tool changer arm. The tool changer carriage is positioned so that an end of the tool changer arm is adjacent to the tool storage magazine in the parked position thereof and an end of the tool changer arm is adjacent to the spindle in the exchange position thereof to enable toolholders to be transferred between the tool changer arm and the tool storage magazine and between the tool changer arm and the spindle.

DESCRIPTION OF THE PREFERRED EMBODIMENTS

Figure 1:
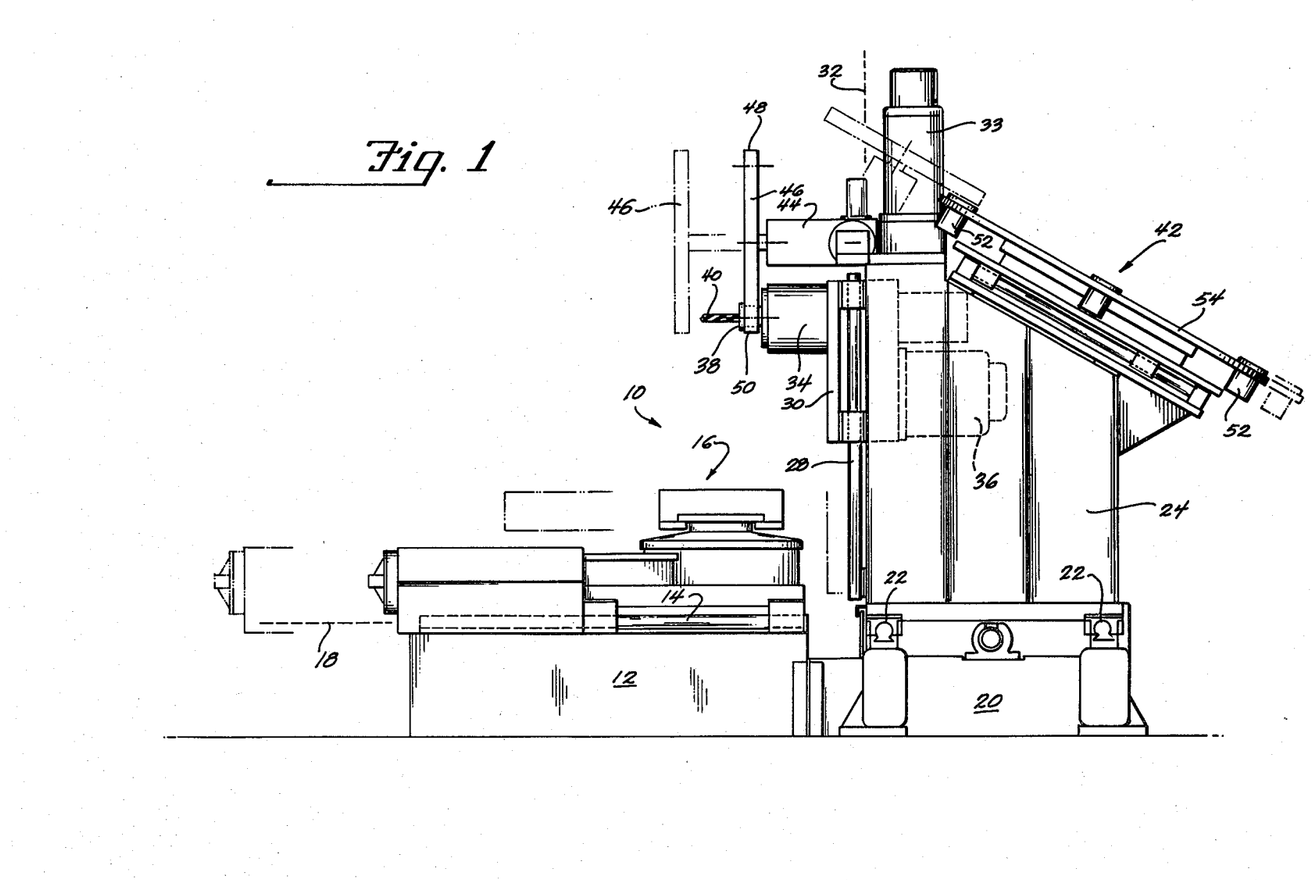
FIG. 1 is a side elevational view of a preferred embodiment of the invention utilized in combination with a horizontal machining center.
Figures 2, 13:
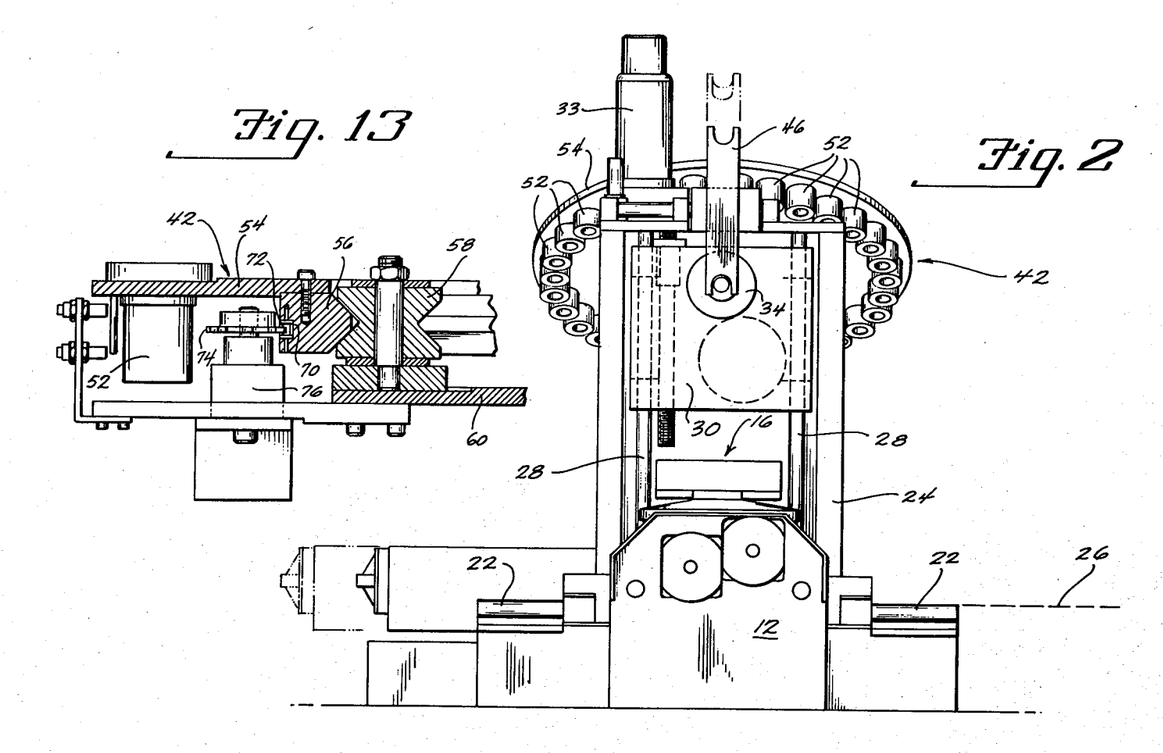
FIG. 2 is a front elevational view of the embodiment of FIG. 1.
FIG. 13 is a fragmentary cross-sectional view taken on the line 13—13 of FIG. 5.
Figure 3:
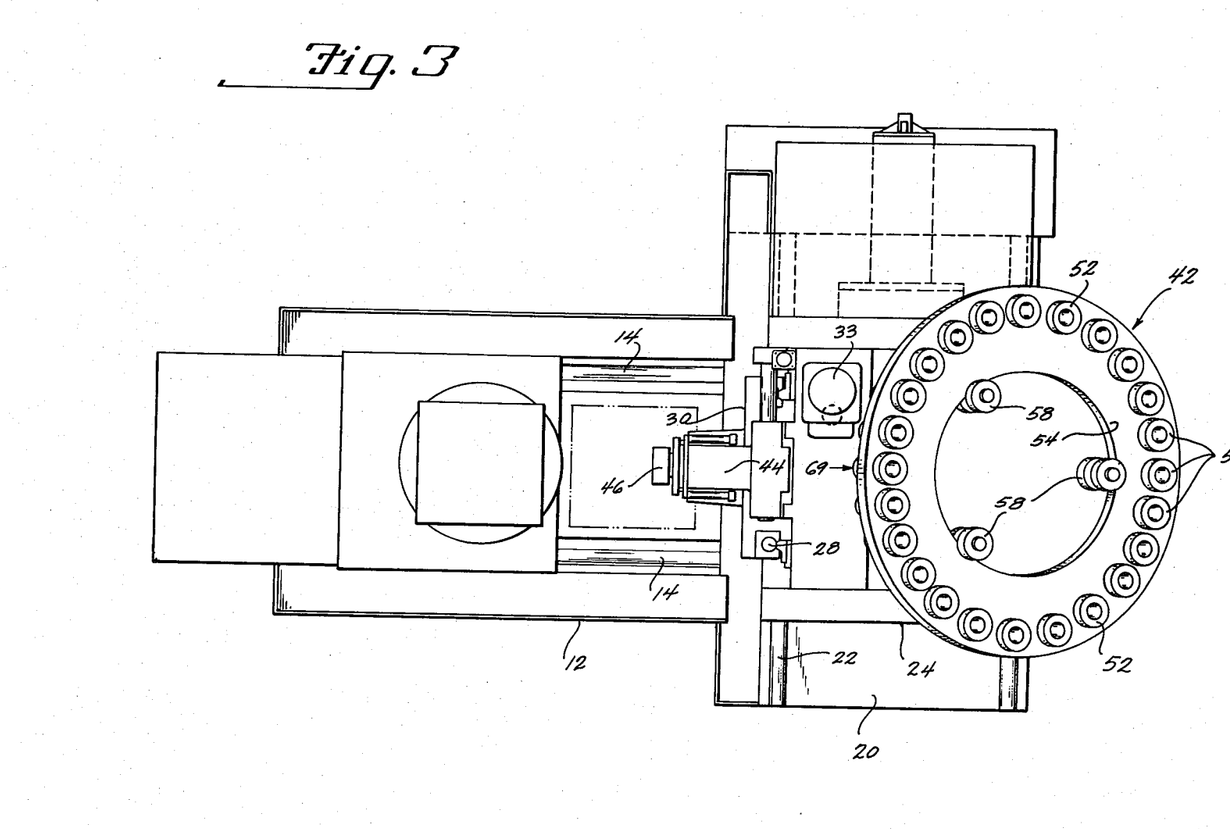
FIG. 3 is a plan view of the embodiment of FIGS. 1 and 2.

FIGS. 1 to 3 show a preferred embodiment of the invention which is utilized in combination with a horizontal machining center 10. Machining center 10 includes a first bed 12 which supports a pair of horizontal ways 14 upon which a worktable 16 is slidably mounted for movement along a horizontal Z axis 18. A second bed 20 supports a second pair of horizontal ways 22 upon which an upright 24 is slidably mounted for movement along a horizontal X axis 26 (FIG. 2) which is perpendicular to Z axis 18. Upright 24 has a pair of vertical ways 28 upon which a spindlehead 30 is slidably mounted for movement along a vertical Y axis 32 which is perpendicular to both Z axis 18 and X axis 26. Spindlehead 30 is driven up and down Y axis 32 by a motor 33 which is coupled to spindlehead 30 by conventional means.

A spindle 34 is rotatably mounted on spindlehead 30 and is rotated by a motor 36 which is coupled to spindle 34 by conventional means not shown. Spindle 34 is adapted to receive toolholders 38 carrying tools 40 and to clamp toolholders 38 thereto. Tools 40 rotate with spindle 34 and are used to perform work on a workpiece (not shown) which is supported on worktable 16.

The tool changer includes a circular tool magazine or drum 42 which is rotatably mounted on upright 24 behind spindle 34 and which is adapted to receive and to store a plurality of toolholders 38. Upright 24 serves as the frame for the tool changer in this embodiment of the invention. A tool changer carriage 44 is pivotally mounted on upright 24 above spindle 34 for movement between an exchange position shown in solid lines in FIG. 1 and a parked position shown in broken lines at the top of FIG. 1. A double-ended tool changer arm 46 is slidably mounted on carriage 44 for movement between a retracted position shown in solid lines in FIG. 1 and an extended position shown in broken lines on the left side of FIG. 1. Tool changer arm 46 is also rotatably mounted on carriage 44 for rotation through 180° about its own axis to interchange the two ends 48 and 50 of tool changer arm 46.

Figure 12:
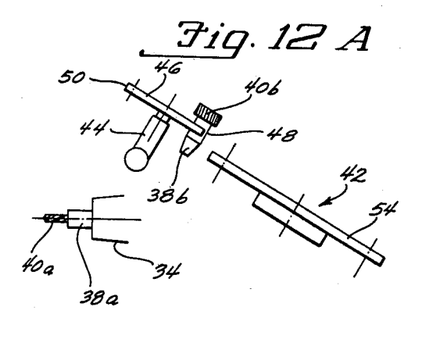
FIGS. 12A through 12X are diagrammatic side elevational views of the spindle, tool changer carriage, tool changer arm and tool storage drum of the embodiment of FIGS. 1 to 3 during the individual steps of a tool change operation.

Both ends 48 and 50 of tool changer arm 46 are adapted to receive toolholders 38 and to clamp toolholders 38 thereto. In the parked position of tool changer carriage 44, one end of tool changer arm 46 is adjacent to tool storage drum 42 as shown by the broken lines in FIG. 1, and in the exchange position, one end of tool changer arm 46 is adjacent to spindle 34 as shown by the solid lines in FIG. 1. To transfer a toolholder 38 from spindle 34 to tool changer arm 46, or vice versa, tool changer carriage 44 is moved to the exchange position and spindle 34 is moved along Y axis 32 to a transfer position shown in FIG. 1 in which the adjacent end of tool changer arm 46 is in operative relationship with spindle 34. To transfer a toolholder 38 from tool storage drum 42 to tool changer arm 46, or vice versa, tool changer carriage 44 is moved to its parked position and tool storage drum 42 is moved to a transfer position shown in FIG. 1 in which the adjacent end of tool changer arm 46 is in operative relationship with tool storage drum 42. Toolholder 38 is then transferred from drum 42 to arm 46 or vice versa. The individual steps of the tool change operation are illustrated in FIGS. 12A to 12X and are described in later paragraphs.

Figure 4:
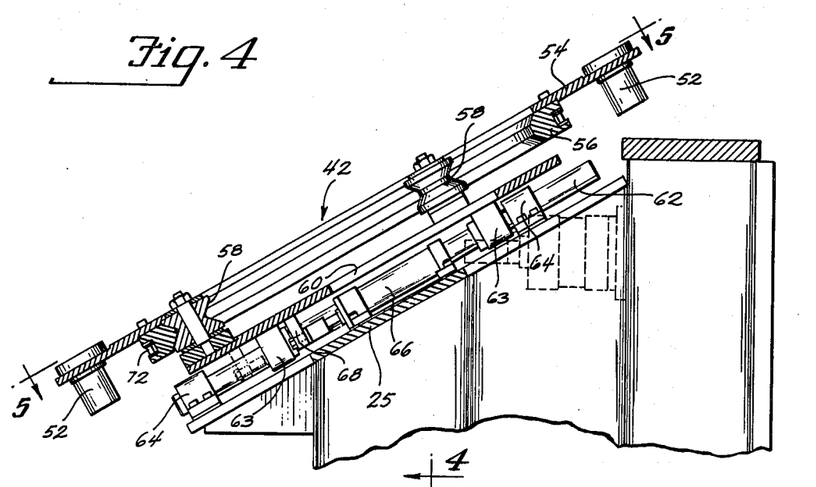
FIG. 4 is a cross-sectional view of the tool storage drum of the embodiment of FIGS. 1 to 3 taken on the line 4—4 of FIG. 5.
Figure 5:
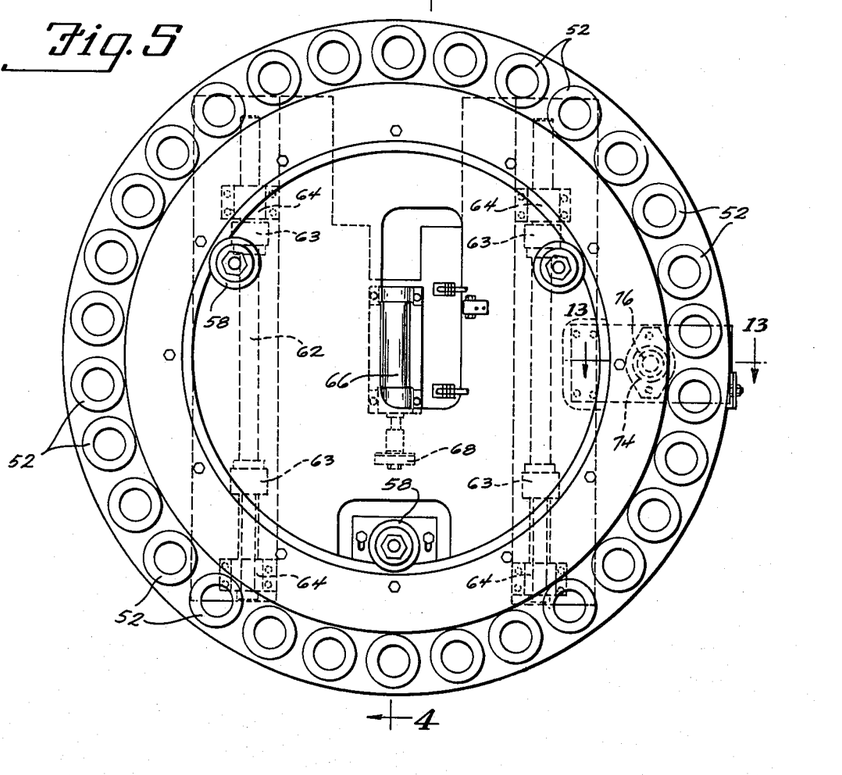
FIG. 5 is a plan view of the tool storage drum of the embodiment of FIGS. 1 to 3 taken on the line 5—5 of FIG. 4.

FIGS. 4 and 5 show the details of tool storage drum 42. The toolholders 38 are held in a ring of sockets 52 which are bolted to a flat toolholder ring 54. There can be any number of sockets 52 in tool drum 42. Toolholder ring 54 is rotatably mounted on upright 24 by means of a guide ring 56 which is bolted to toolholder ring 54 and engages rollers 58. Rollers 58 and guide ring 56 have matching V-shaped surfaces which engage each other as shown in the lefthand portion of FIG. 4. Rollers 58 are rotatably mounted on a base plate 60 which, in turn, is slidably mounted on rods 62 which are rigidly attached to the top 25 of upright 24 by means of brackets 64 bolted to top 25. Four sleeves 63 are welded to the bottom of base plate 60 and slidably engage rods 62 to serve as a slidable mounting for base plate 60.

Base plate 60 is slidable between a parked position and a transfer position by means of a hydraulic ram 66 whose body portion is bolted to upright top 25 and whose piston portion is attached to a bracket 68 on the bottom of base plate 60. When the piston of hydraulic ram 66 is extended, it pushes base plate 60 in a leftward direction as viewed in FIG. 4 to the parked position and when the piston of hydraulic ram 66 is retracted, it pulls base plate 60 in a rightward direction as viewed in FIG. 4 to the transfer position. Toolholder ring 54 and guide ring 56 move with base plate 60 between the parked and the transfer positions. Tool drum 42 has a ready station 69 (FIG. 3) at which position tool changer arm 46 can remove a toolholder 38 from toolholder ring 54. To remove a selected tool from toolholder ring 54, ring 54 is rotated to place the selected tool in ready station 69, then tool changer carriage 44 and tool changer arm 46 are actuated to remove the selected tool from ready station 69.

A groove 70 is formed in the outer periphery of guide ring 56 and a drive chain 72 is seated in groove 70 and is rigidly attached to guide ring 56. Drive chain 72 is engaged by a drive sprocket 74 (FIG. 13) which is rotated by a motor 76 mounted on base plate 60. Motor 76 and drive sprocket 74 serve to rotate toolholder ring 54 to place any desired toolholder 38 in position to be transferred to tool changer arm 46. Motor 76 is controlled by a conventional motor control circuit which is not shown in the drawings.

Figures 6, 7:
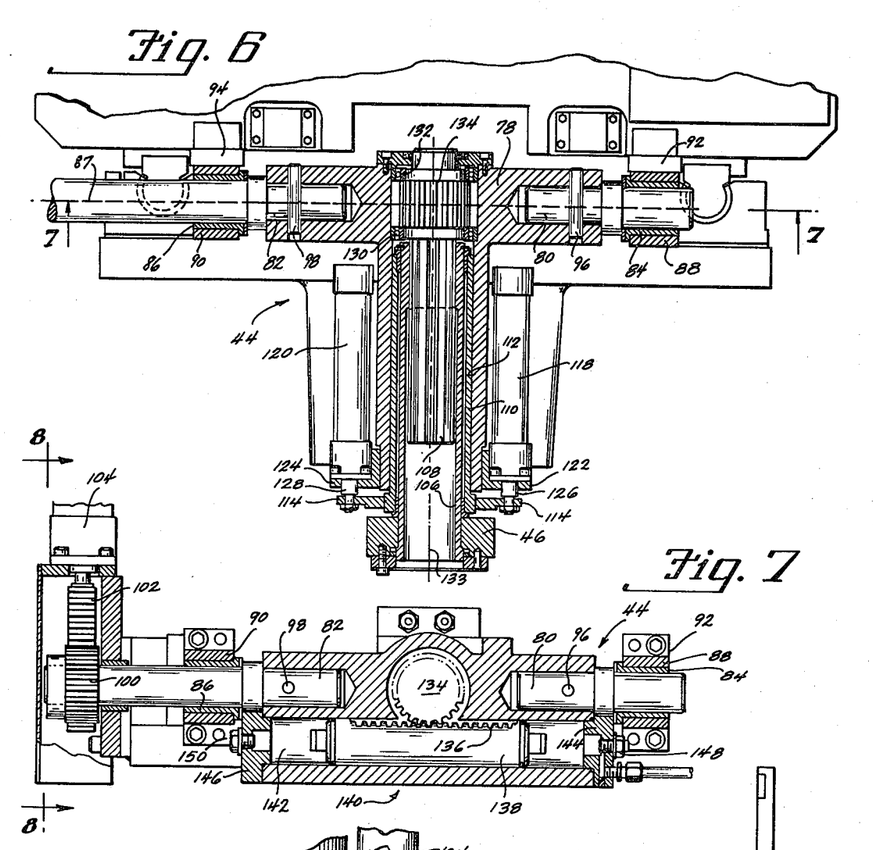
FIG. 6 is a cross-sectional view of the tool changer arm and tool changer carriage of the embodiment of FIGS. 1 to 3.
FIG. 7 is a cross-sectional view taken on the line 7—7 of FIG. 6.
Figure 8:
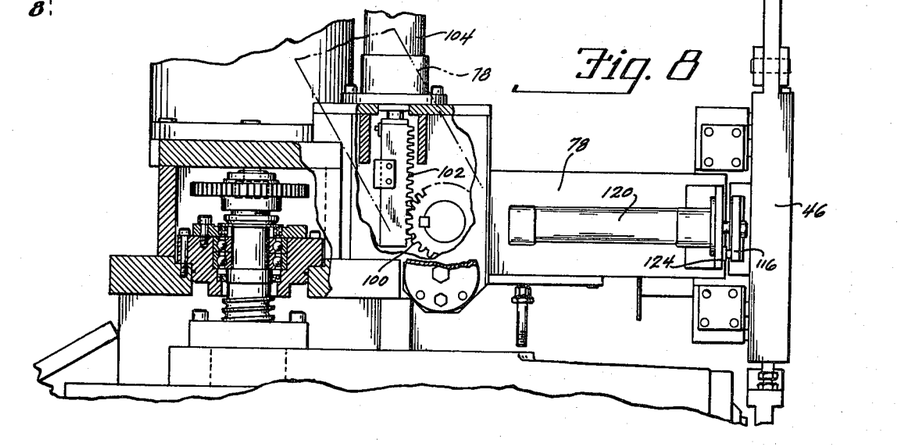
FIG. 8 is a side elevational view, partially cut away, taken on the line 8—8 of FIG. 7.

FIGS. 6, 7 and 8 show details of tool changer carriage 44, tool changer arm 46 and the drive means therefor. Tool changer carriage 44 includes a T-shaped housing 78 (FIG. 6) which is attached to two coaxial shafts 80 and 82 that are journaled to upright 24 by bearing sleeves 84 and 86 for rotation about an axis 87 which corresponds to the crossbar of said T-shape. Bearing sleeves 84 and 86 are supported by sockets 88 and 90 which are attached to upright 24 by brackets 92 and 94. Shafts 80 and 82 are pinned to housing 78 by pins 96 and 98. Housing 78 can be rotated through 120° about the common axis 87 of shafts 80 and 82 to swing tool changer carriage 44 between its parked and its exchange positions.

A drive gear 100 (FIG. 7) is attached to the outer end of shaft 82 and engages a rack 102 which is driven by a hydraulic ram 104. When the piston of hydraulic ram 104 is extended, it rotates housing 78 from its exchange position, shown in solid lines in FIG. 8, to its parked position, shown in broken lines in FIG. 8. When the piston of hydraulic ram 104 is retracted, it rotates housing 78 from its parked position to its exchange position.

Tool change arm 46 is rigidly mounted on the end of a splined sleeve 106 (FIG. 6) which is slidably mounted on a splined shaft 108 for movement between an extended and retracted position of tool changer arm 46. Tool changer arm 46 is shown in its retracted position in FIGS. 6 and 8. An outer sleeve 110 is rigidly attached to splined sleeve 106 and is slidable in a socket 112 in housing 78. A bracket 114 is rigidly attached to the front end of outer sleeve 110. A pair of hydraulic cylinders 118 and 120 are mounted on the exterior of housing 78 on brackets 122 and 124 and have piston rods 126 and 128 which are attached to bracket 114 for moving tool changer arm 46 between its extended and retracted positions.

For the purpose of rotating tool change arm 46 through 180° to interchange its ends, splined shaft 108 is journaled in housing 78 by bearings 130 and 132 (FIG. 6) for rotation about axis 133 which corresponds to the stem of T-shaped housing 78 and has a gear 134 formed thereon which is driven by a rack 136 (FIG. 7). Rack 136 is formed on the piston 138 of a hydraulic ram 140 which is formed in housing 78. Piston 138 is slidable in a bore 142 in housing 78 under gear 134. Bore 142 has a central opening through which gear 134 extends to engage rack 136. The ends of bore 142 are closed by end plugs 144 and 146 which contain conventional hydraulic fluid ports and adjustment screws 148 and 150 which set the limits of travel for piston 138.

Figures 9, 10, 11:
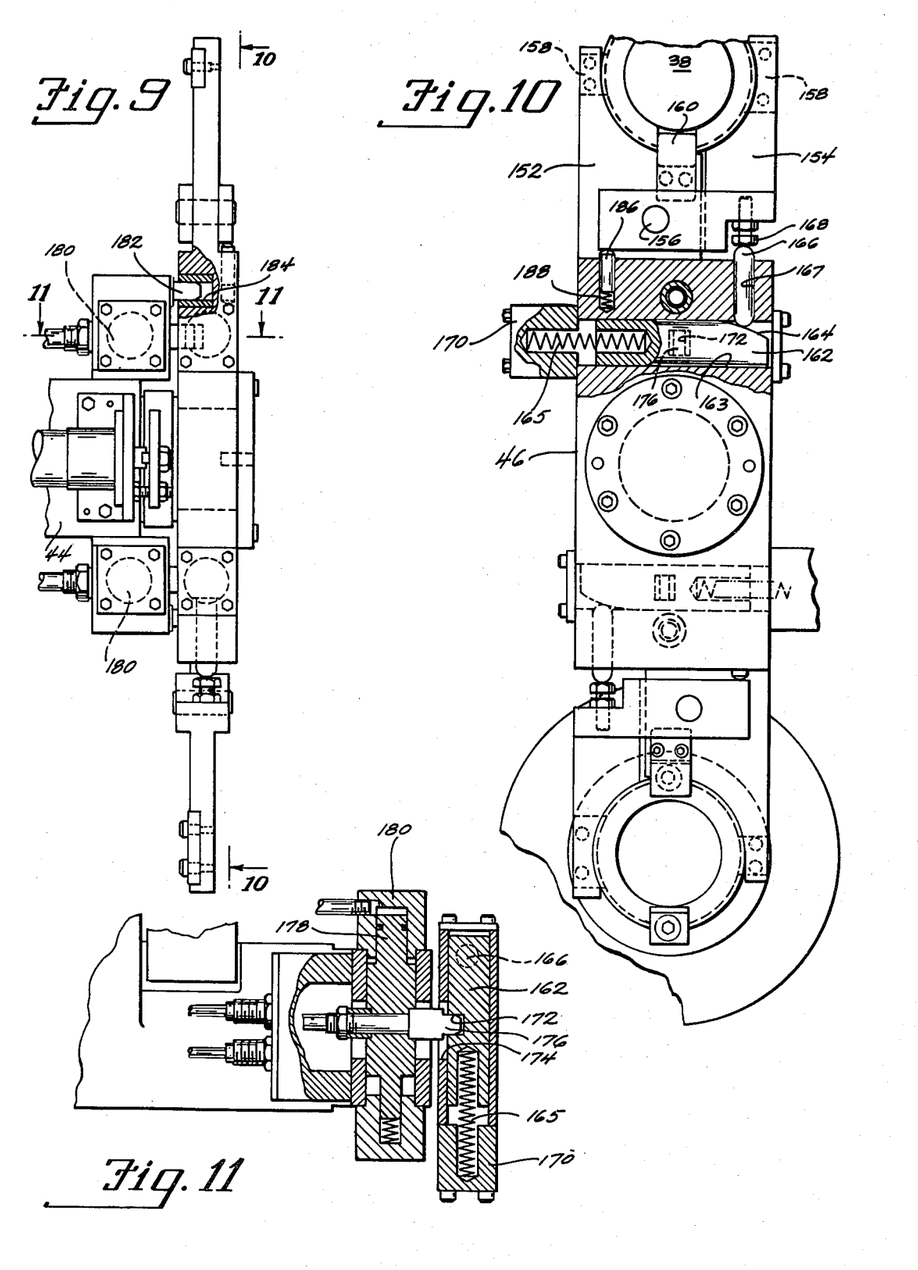
FIG. 9 is a side elevational view of the tool changer arm of the embodiment of FIGS. 1 to 3.
FIG. 10 is a plan view taken on the line 10—10 of FIG. 9.
FIG. 11 is a cross-sectional view taken on the line 11—11 of FIG. 9.

FIGS. 9 to 11 show the details of the clamps on the ends of tool changer arm 46 for gripping toolholders 38. Each clamp is made up of a fixed jaw 152 and an L-shaped movable jaw 154 which is pivotally attached to fixed jaw 152 by a pivot pin 156. Both jaws 152 and 154 are recessed at their ends in a semicircular arc to embrace toolholder 38 as shown in FIG. 10. Inserts 158 are mounted on jaws 152 and 154 in position to engage a peripheral groove in toolholder 38 to clamp toolholder 38 therebetween when movable jaw 154 is in the closed position. An alignment key 160 is attached to fixed jaw 152 in position to engage an alignment slot in toolholder 38.

Movable jaw 154 is spring biased in its clamped position by a cam assembly which includes a cam plunger 162 having a curved cam surface 164, a spring 165, a cam follower pin 166 and adjustment screw 168. Cam follower pin 166 is slidably mounted in a bore 167 in tool changer arm 46 and is normally pressed against adjustment screw 168 by pressure from cam surface 164. Cam plunger 162 is slidably mounted in a bore 163 in tool changer arm 46 and is urged toward the right in FIG. 10 by spring 165 which is mounted in a housing 170 bolted to the side of tool changer arm 46. The pressure exerted on movable jaw 154 by the above-described cam assembly holds toolholder 38 clamped therein until the pressure is released by moving cam plunger 162 to the left in FIG. 10.

For the purpose of engaging cam plunger 162 for movement, a recess 172 is formed therein which is aligned with an opening 174 (FIG. 11) in tool changer arm 46. When tool changer arm 46 is in its retracted position, a pin 176 is engaged in recess 172. Pin 176 is attached to the piston 178 of a hydraulic ram 180 mounted on the end of tool changer carriage 44. Hydraulic ram 180 moves pin 176 downwardly in FIG. 11

(to the left in FIG. 10) against the force of spring 165 to unclamp movable jaw 154.

When movable jaw 154 is unclamped, it is forced open by a spring loaded pin 186 (FIG. 10) which bears against movable jaw 154 and moves it to the unclamped position. The spring 188 which presses against pin 186 is considerably weaker than spring 165 and is overcome by the force of spring 165.

The other end of tool changer arm 46 is identical in structure and function with the above-described end and interacts with an identical hydraulic cylinder 180 on the end of tool changer carriage 44.

The detailed steps involved in transferring toolholders 38 between tool storage drum 42 and spindle 34 are illustrated in FIGS. 12A through 12X. FIG. 12A shows the relationship of parts during a machining operation. A toolholder 38a carrying a tool 40a is clamped in spindle 34 while a toolholder 38b carrying the next tool 40b to be used in the machining cycle is clamped in the distal end 48 of tool changer arm 46. The proximal end 50 of tool changer arm 46 is empty. Tool changer arm 46 is in its retracted position and tool changer carriage 44 is in its parked position. Tool storage drum 42 is in its parked position. Spindle 34 can be anywhere along the Y axis. The steps involved in replacing toolholder 38a with toolholder 38b will be described in numeral sequence as follows:

1. Spindle 34 is moved to a ready position adjacent to the upper limit of Y axis travel. In this particular example, the spindle ready position is 5" below the upper limit of Y axis travel.

2. Spindle 34 is keylocked as indicated in FIG. 12B.

3. Tool changer carriage 44 is rotated from its parked position to its exchange position, as shown in FIG. 12C. At the same time, tool storage drum 42 is rotated to locate the correct empty tool socket in position to receive tool 38a when it is removed from spindle 34.

4. Spindle 34 is moved to its transfer position in which the empty end 50 of tool changer arm 46 embraces toolholder 38a, as shown in FIG. 12D.

5. The clamp on the end 50 of tool changer arm 46 is closed to grasp toolholder 38a and clamp it to end 50, as indicated in FIG. 12E.

6. The toolholder clamp in spindle 34 is released, as indicated in FIG. 12F.

7. Tool changer arm 46 is moved from its retracted position to its extended position, as shown in FIG. 12G, to withdraw toolholder 38a from spindle 34.

8. Tool changer arm 46 is rotated through 180°, as shown in FIG. 12H, to interchange the position of toolholders 38a and 38b.

9. Tool changer arm 46 is moved from its extended to its retracted position, as shown in FIG. 12I, to insert toolholder 38b into spindle 34.

10. The toolholder clamp in spindle 34 is actuated to clamp toolholder 38b in spindle 34, as indicated in FIG. 12J.

11. The clamp on the end 48 of tool changer arm 46 is opened to release toolholder 38b, as indicated in FIG. 12K.

12. Spindle 34 is moved from its transfer position to its ready position, as indicated in FIG. 12L.

13. Tool changer carriage 44 is rotated from its exchange position to its parked position, as shown in FIG. 12M.

14. Tool changer arm 46 is moved from its retracted position to its extended position, as shown in FIG. 12N.

15. Tool storage drum 42 is moved from its parked position to its transfer position, as indicated in FIG. 12O. An empty toolholder socket has previously been positioned under end 50 of tool changer arm 46 to receive toolholder 38a.

16. Tool changer arm 46 is moved from its extended position to its retracted position, as shown in FIG. 12P, to insert tool 38a into the empty socket.

17. The clamp on the end 50 of tool changer arm 46 is opened, as indicated in FIG. 12Q, to release toolholder 38a.

18. Tool storage drum 42 is moved from its transfer position to its parked position, as indicated in FIG. 12R.

19. Tool storage drum 42 is rotated, as indicated in FIG. 12S, to place the next toolholder 38c to be used in the machining cycle opposite the end 50 of tool changer arm 46.

20. Tool storage drum 42 is moved from its parked position back to its transfer position, as indicated in FIG. 12T, to place toolholder 38c in the end 50 of tool changer arm 46.

21. The clamp on the end 50 of tool changer arm 46 is closed, as indicated in FIG. 12U, to clamp toolholder 38c in end 50.

22. Tool changer arm 46 is moved from its retracted to its extended position, as shown in FIG. 12V, to withdraw toolholder 38c from its storage socket.

23. Tool storage drum 42 is moved from its transfer position to its parked position, as shown in FIG. 12W.

24. Tool changer arm 46 is moved from its extended to its retracted position, as shown in FIG. 12X. This returns the tool changer to the initial condition described immediately before step No. 1 of the tool change cycle and completes the tool change cycle.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. In a tool storage magazine for storing a plurality of tools for use selectively in the operating station of a machine tool;
   a frame;
   a tool change station in said magazine for individually receiving the tools for transfer from said magazine to the operating station of the machine tool;
   a tool storage ring having a plurality of toolholders for individually holding the tools;
   an annular groove formed in said tool storage ring;
   a plurality of rollers rotatably supported by said frame in position so that the peripheries of each of said rollers is in engagement with said annular groove for rotatably supporting said tool storage ring on said frame; and
   power means connected to rotate said storage ring for selectively moving said tools into said tool change station.

2. In a tool storage magazine for storing a plurality of tools for use selectively in the operating station of a machine tool;

a frame;

a tool change station in said magazine for individually receiving the tools for transfer from said magazine to the operating station of the machine tool;

a tool storage ring rotatably supported by said frame;

a plurality of toolholders carried by said storage ring for individually holding the tools in said ring;

a sprocket chain rigidly fixed to said storage ring for rotation therewith;

a sprocket in engagement with said chain; and power means connected to rotate said sprocket to cause rotation of said tools into said tool change station.

3. In a tool storage magazine according to claim 1, including a sprocket chain rigidly fixed to said storage ring for rotation therewith; and a sprocket in engagement with said chain and wherein said power means is connected to rotate said sprocket for causing rotation of said ring.

4. An automatic tool storage magazine according to claims 1, 2 or 3, including a base plate slidably supported by said frame for movement in a rectilinear path of travel and wherein said rollers are rotatably supported by said base plate; and actuating means coupled between said frame and said base plate for moving the latter in its path of travel relative to said frame for moving said tool storage ring between a parked position and a tool transfer position.

5. An automatic tool storage magazine according to claim 4 wherein said base plate is slidably mounted on said frame by means of a pair of parallel rods rigidly attached to said frame; and a plurality of sleeves rigidly attached to said base plate with each of said sleeves being slidably engaged on one of said rods.

* * * * *